United States Patent
Takasu et al.

(10) Patent No.: US 9,176,768 B2
(45) Date of Patent: Nov. 3, 2015

(54) JOB EXTRACTION METHOD, JOB EXTRACTION DEVICE, AND JOB EXTRACTION SYSTEM

(71) Applicant: FUJITSU LIMITED, Kawasaki-shi, Kanagawa (JP)

(72) Inventors: Yasuhide Takasu, Kitakyusu (JP); Kouichi Soejima, Kashiwa (JP); Taisuke Konishi, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/314,198

(22) Filed: Jun. 25, 2014

(65) Prior Publication Data

US 2015/0089506 A1    Mar. 26, 2015

(30) Foreign Application Priority Data

Sep. 24, 2013    (JP) ................ 2013-197156

(51) Int. Cl.
*G06F 9/46*      (2006.01)
*G06Q 10/06*    (2012.01)
*G06F 9/48*      (2006.01)

(52) U.S. Cl.
CPC ........... *G06F 9/46* (2013.01); *G06F 9/4881* (2013.01); *G06Q 10/06* (2013.01)

(58) Field of Classification Search
CPC .............................. G06F 9/4881; G06Q 10/06
USPC ........................................ 718/102; 700/100
See application file for complete search history.

(56) References Cited

U.S. PATENT DOCUMENTS

| | | | | |
|---|---|---|---|---|
| 4,791,554 A | * | 12/1988 | Hirota et al. ........................... 1/1 |
| 5,890,134 A | * | 3/1999 | Fox ................ 705/7.24 |
| 6,047,260 A | * | 4/2000 | Levinson ............... 705/7.15 |
| 6,381,580 B1 | * | 4/2002 | Levinson ............... 705/7.13 |
| 7,613,589 B2 | * | 11/2009 | Hosagrahara .............. 702/182 |
| 7,752,622 B1 | * | 7/2010 | Markov ................ 718/103 |
| 7,991,633 B2 | * | 8/2011 | Baker et al. ............. 705/7.13 |
| 8,484,643 B2 | * | 7/2013 | Takatsu et al. ............. 718/101 |
| 2007/0094661 A1 | * | 4/2007 | Baird et al. ............. 718/102 |
| 2007/0220520 A1 | | 9/2007 | Tajima |
| 2011/0090517 A1 | * | 4/2011 | Togawa ................... 358/1.1 |
| 2011/0194146 A1 | * | 8/2011 | Sato .............................. 358/1.15 |
| 2012/0268785 A1 | * | 10/2012 | Okada et al. ................ 358/1.15 |

FOREIGN PATENT DOCUMENTS

JP    2003-58518    2/2003
JP    2012-73690    4/2012

* cited by examiner

*Primary Examiner* — Phillip H Nguyen
(74) *Attorney, Agent, or Firm* — Staas & Halsey LLP

(57) ABSTRACT

A job extraction method, includes: referring to first information indicating an input time, a start time, an execution time, and a number of computation resources to be used, for each of jobs to be executed using one of computation resources; specifying first jobs having a first waiting time and a first start time later than a second start time of a second job having a second input time earlier than the first input time; and extracting, based on second information indicating a time-sequential transition of a number of computation resources not being used, a third job for which a state where computation resources of a number being equal to or greater than the number of computation resources to be used for one of the first jobs are not being used has continued for a first execution time of the first job or longer during the first waiting time.

8 Claims, 9 Drawing Sheets

FIG. 7

| JOB ID | 001 |
|---|---|
| JOB NAME | GAUSIAN 13_01 |
| USER NAME | GUEST |
| EXECUTION PROGRAM NAME | GAUSIAN13 |
| NUMBER OF RESOURCES TO BE USED | 80 |
| EXPECTED EXECUTION TIME | 6H |

FIG. 8

| JOB ID | 001 |
|---|---|
| JOB NAME | GAUSIAN 13_01 |
| USER NAME | GUEST |
| NUMBER OF RESOURCES TO BE USED | 80 |
| INPUT TIME | 10:00 |
| JOB INPUT-TIME RESOURCE UTILIZATION RATE | 60% |
| START TIME | 10:10 |
| END TIME | 15:00 |
| EXECUTION TIME | 4H50M |
| WAITING TIME | 0H10M |
| BACKFILLING APPLICATION FLAG | NO |
| LONGEST AVAILABLE TIME DURING WAITING | 3H30M |

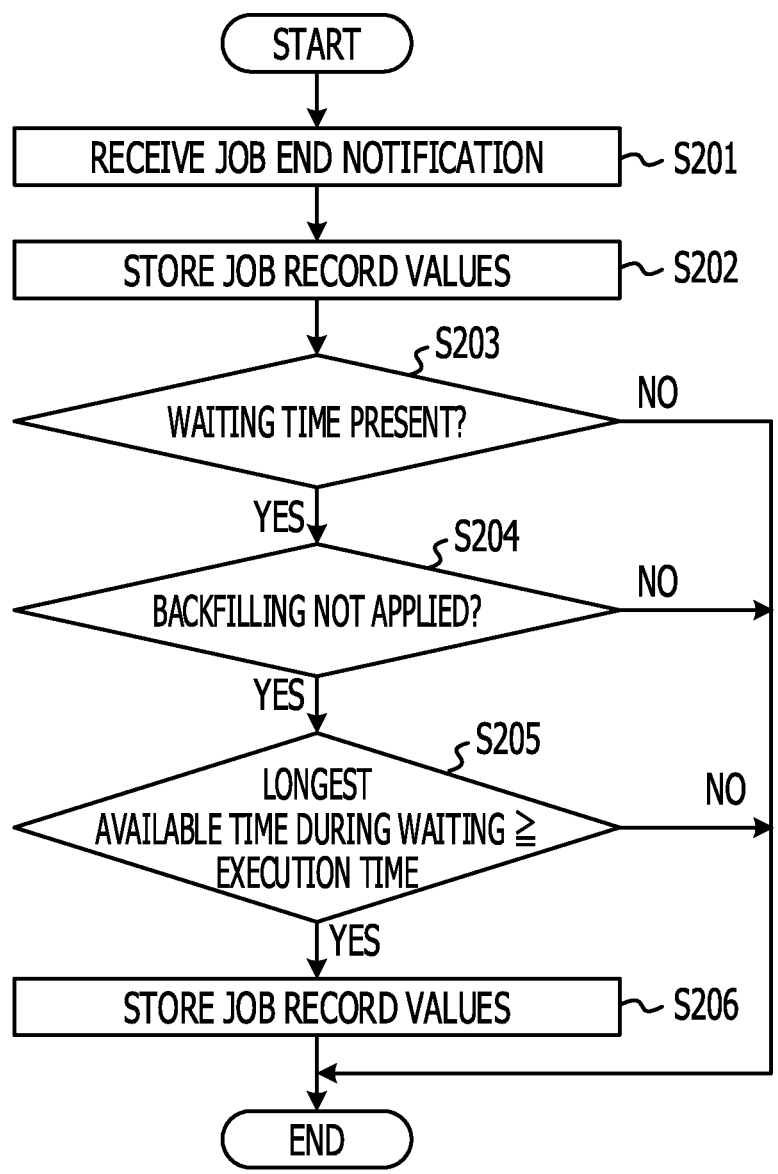

JOB EXTRACTION METHOD, JOB EXTRACTION DEVICE, AND JOB EXTRACTION SYSTEM

CROSS-REFERENCE TO RELATED APPLICATION

This application is based upon and claims the benefit of priority from the prior Japanese Patent Application No. 2013-197156 filed on Sep. 24, 2013, the entire contents of which are incorporated herein by reference.

FIELD

The embodiment discussed herein is related to a job extraction method, a job extraction device, and a job extraction system.

BACKGROUND

In computation centers and so forth that possess a PC cluster, the execution order of computation jobs (hereafter simply referred to as "jobs") input by a large number of users is managed by management software called job schedulers. The job execution order is decided based on a first-in first-out (FIFO) system.

Related technology is disclosed in Japanese Laid-open Patent Publication No. 2003-58518 and Japanese Laid-open Patent Publication No. 2012-73690.

SUMMARY

According to one aspect of the embodiments, a job extraction method, includes: referring, by a computer, to a storage unit that stores first information indicating an input time, a start time, an execution time, and a number of computation resources to be used, for each of a plurality of jobs that are to be executed using one of a plurality of computation resources; specifying, from among the plurality of jobs, a plurality of first jobs having a first waiting time from a first input time to a first start time which is later than a second start time of a second job having a second input time which is earlier than the first input time; and extracting, based on second information indicating a time-sequential transition of a number of computation resources that are not being used derived based on the input time, the start time, the execution time, and the number of computation resources to be used, from among the plurality of first jobs, a third job for which a state where computation resources of a number equal to or greater than the number of computation resources to be used for one of the plurality of first jobs are not being used has continued for a first execution time of the first job or longer during the first waiting time of the one of the plurality of first jobs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 depicts an exemplary job input information;
FIG. 8 depicts an exemplary job record information;
and
FIG. 9 depicts an exemplary processing of a job management device.

DESCRIPTION OF EMBODIMENT

Figure 1:
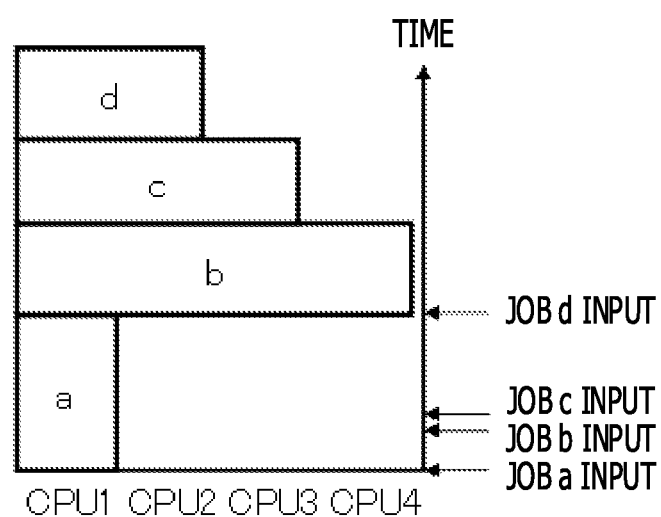
FIG. 1 depicts an exemplary job execution order.

FIG. 1 depicts an exemplary job execution order. In FIG. 1, a job execution order based on the FIFO system is depicted. In FIG. 1, the vertical axis indicates time, and the horizontal axis indicates CPUs (computation resources). For example, the number of CPUs used by each job is expressed by the horizontal width of the rectangles representing each job. For example, job a uses one CPU, job b uses four CPUs in a parallel manner, job c uses three CPUs in a parallel manner, and job d uses two CPUs in a parallel manner. The time period from the start of each job to the end (hereafter referred to as the "execution time") is indicated by the vertical height of the rectangles. The start time and the end time of each job are indicated by the positions of the rectangles.

In FIG. 1, jobs are input in the order of job a, job b, job c, and job d. Consequently, in the FIFO system, the jobs are executed in the order of job a, job b, job c, and job d.

During the execution of job a, three CPUs are not being used. If the three CPUs are utilized effectively, the usage efficiency of the CPUs may improve. Backfilling is an example of a method for improving the usage efficiency of CPUs not being used during the execution of a job.

Figure 2:
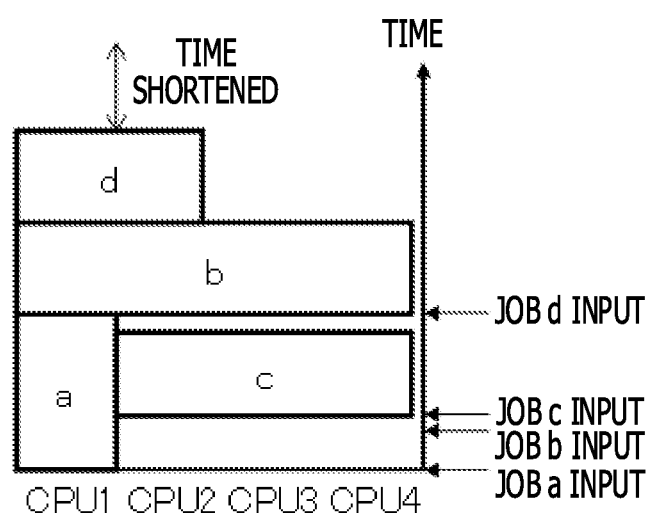
FIG. 2 depicts an exemplary backfilling.

FIG. 2 depicts an exemplary backfilling. FIG. 2 may be viewed in the same manner as FIG. 1. The input order of the jobs in FIG. 2 may be the same as in FIG. 1.

In FIG. 2, job c is executed at the same time as being input, parallel with job a. The start time of job b is not delayed. As a result, the time desired for executing all of the jobs from job a to job d may be shortened. For example, in backfilling, a scheduling system is adopted in which, if there is a waiting job, "job b" for example, that has an execution order ahead of an executable job, "job c" for example, that is able to be executed using a currently available CPU, job c is executed first (job overtaking is executed) as long as a delay is not caused for the execution start of job b.

The effectiveness of backfilling depends on the accuracy of a prediction value (hereafter referred to as the "expected execution time") that is input by a user when a job is input. This is because, in backfilling, the expected execution time is used to determine whether job overtaking is possible.

For example, when a job for which it is very difficult to calculate the expected execution time is input, the expected execution time may deviate considerably from the actual execution time. Due to the user lacking the skill for calculating the expected execution time of a job, or due to the user having low awareness regarding improving the accuracy of the expected execution times of jobs, in the expected execution time of a job, a value that, to be safe, is longer than the actual execution time may be designated as the expected execution time.

When an expected execution time that has a low degree of accuracy and is longer than the actual execution time is designated, backfilling may not be applied for jobs that would be able to overtake other jobs by using backfilling. Due to these kinds of jobs, the usage efficiency of the computation resources of the entire computation center may decrease.

Figure 3:
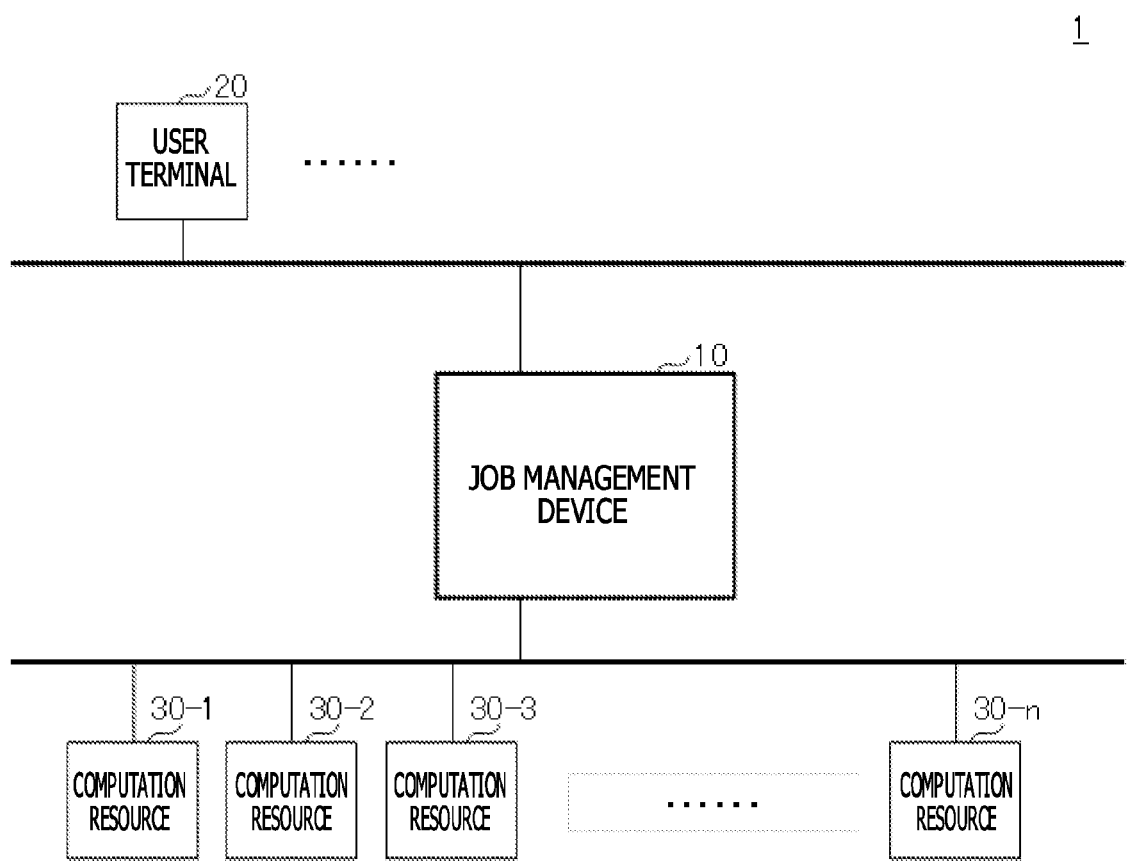
FIG. 3 depicts an exemplary computation center.

FIG. 3 depicts an exemplary computation center. In FIG. 3, a computation center 1 includes one or more user terminals 20, a job management device 10, and a plurality of computation resources such as computation resources 30-1 to 30-*n*. If the computation resources 30-1 to 30-*n* are not individually distinguished, they may be referred to as the "computation resources 30"

The user terminals 20 and the job management device 10 are coupled via a network such as a local area network (LAN). The job management device 10 and the computation resources 30 are coupled via a network such as a LAN. The computation resources 30 are also coupled to each other via the network.

The user terminals 20 may be terminals such as personal computers (PCs) that users of the computation center 1 use for inputting jobs and so forth. A smart phone, a tablet-type terminal, or a mobile telephone or the like may be used as a user terminal 20. The jobs may be computation processing that is executed using one or more of the computation resources 30 in accordance with an instruction from a user. A plurality of types of jobs may be executed in the computation center 1.

The computation resources 30, for example, may be parallel supercomputers or computer clusters or the like. Each of the computation resources 30 depicted in FIG. 3 may not be a single computer, and may be a plurality of computers that are coupled by an interconnected network. Each of the computation resources 30 may be one or more CPUs or processor cores. In FIG. 3, for convenience of description, a computation resource 30 is one CPU that includes one processor core. Therefore, in the case where the computation resources 30 are CPUs that include multi-core processors, the number of CPUs may be replaced by the number of processor cores.

The job management device 10 may be a computer that, in accordance with job execution requests received from the user terminals 20, decides the job execution order, and allocates jobs (dispatches jobs) to the computation resources 30, and so forth.

Figure 4:
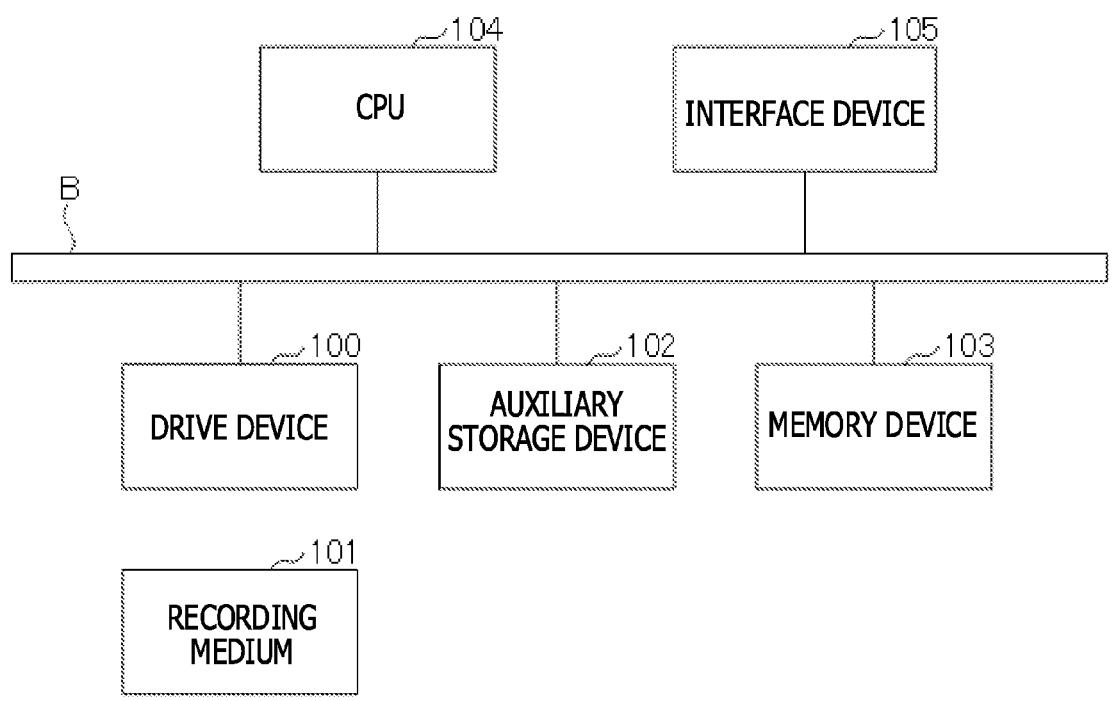
FIG. 4 depicts an exemplary hardware configuration of a job management device.

FIG. 4 depicts an exemplary hardware configuration of a job management device. The job management device 10 of FIG. 4 includes a drive device 100, an auxiliary storage device 102, a memory device 103, a CPU 104, and an interface device 105 and so forth that are coupled to each other by a bus B.

A program that executes the processing in the job management device 10 may be provided by a recording medium 101. When the recording medium 101 having the program recorded thereon is set in the drive device 100, the program is installed from the recording medium 101 onto the auxiliary storage device 102 via the drive device 100. For example, the installation of the program may be carried out via the recording medium 101, or by being downloaded from another computer via a network. The auxiliary storage device 102 stores the installed program, and also stores desired files and data and so forth.

In the case where there has been a program activation instruction, the memory device 103 reads the program from the auxiliary storage device 102 and stores the program. The CPU 104 executes functions relating to the job management device 10 in accordance with the program stored in the memory device 103. The interface device 105 is used as an interface for coupling to a network.

The recording medium 101 may include a portable recording medium such as a CD-ROM, a DVD disc, or a USB memory. The auxiliary storage device 102 may include a hard disk drive (HDD) or a flash memory or the like. The recording medium 101 and the auxiliary storage device 102 may correspond to a computer-readable recording medium.

Figure 5:
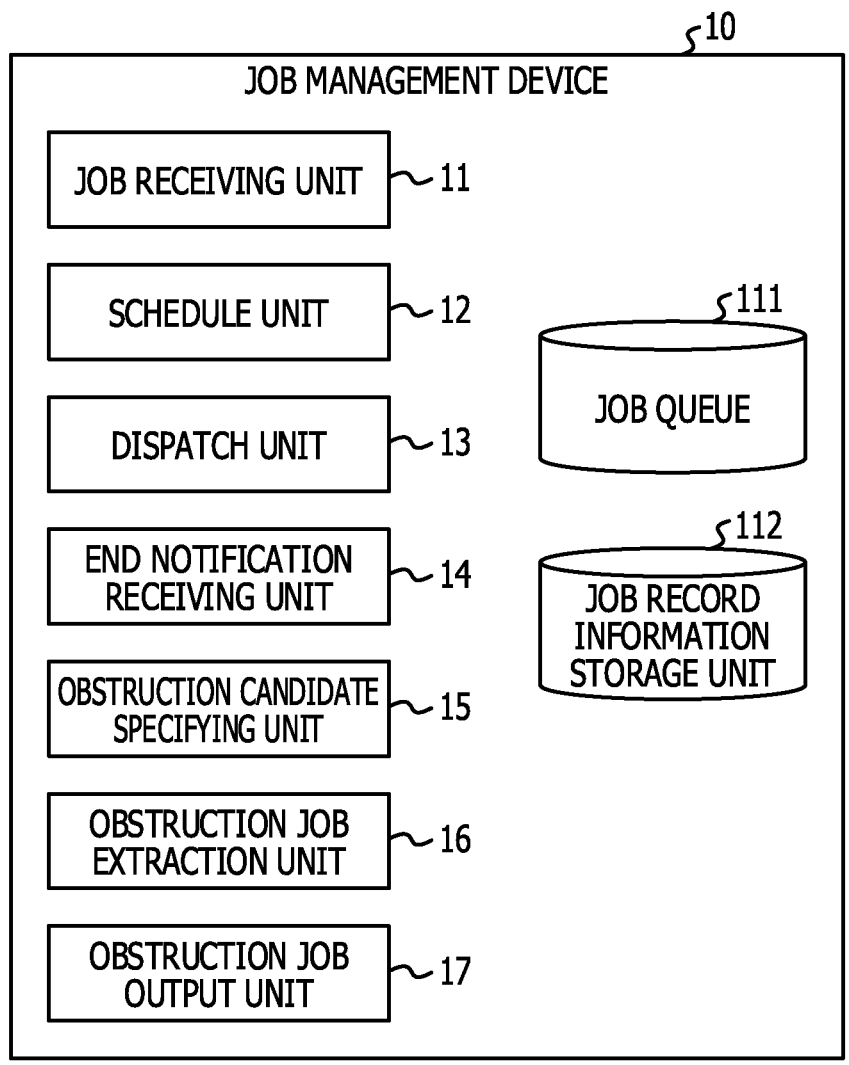
FIG. 5 depicts an exemplary functional configuration of a job management device.

FIG. 5 depicts an exemplary functional configuration of a job management device. The job management device 10 depicted in FIG. 5 includes a job receiving unit 11, a scheduling unit 12, a dispatch unit 13, an end notification receiving unit 14, an obstruction candidate specifying unit 15, an obstruction job extraction unit 16, and an obstruction job output unit 17. The functions of these units are realized by the CPU 104 executing a program installed in the job management device 10. The job management device 10 uses a job queue 111 and a job record information storage unit 112 and so forth. The memory device 103, the auxiliary storage device 102, or a storage device or the like coupled to the job management device 10 via a network may be used as the job queue 111 and the job record information storage unit 112.

The job receiving unit 11 receives, by the user terminals 20, job execution requests that have been input by users. The scheduling unit 12 decides the job execution order relating to the execution requests, and, in accordance with the execution order, stores information designated when jobs are input (hereafter referred to as "job input information"), in the job queue 111. The job queue 111 stores, in the job execution order, the job input information of waiting jobs. Waiting jobs represent jobs for which a computation resource 30 has not been allocated because jobs are being executed. The scheduling unit 12, for example, based on the first-in first-out (FIFO) system, decides the job execution order. For example, the job execution order may be the same as the job input order. Backfilling may be applied for jobs for which it is possible for backfilling to be applied. Jobs for which backfilling is applied may overtake jobs that are ahead in the execution order based on the FIFO system.

The dispatch unit 13 dispatches (allocates) jobs to the computation resources 30 in the order stored in the job queue 111. Jobs may be started in accordance with the dispatch of jobs. The end notification receiving unit 14 receives notifications indicating the end of a job from the computation resources 30.

The obstruction candidate specifying unit 15 specifies, from among the executed jobs, candidates for jobs that have obstructed the opportunity to utilize backfilling (hereafter referred to as "obstruction jobs"). For example, an obstruction job represents a job for which backfilling has not been applied even though it would have been possible for backfilling to be applied. The reason for backfilling having not been applied is that backfilling may not have been applied due to the expected execution time designated by the user having been overestimated.

For example, the obstruction candidate specifying unit 15 may specify an obstruction job candidate by removing, from among the executed jobs, jobs that do not correspond to obstruction jobs. For example, an obstruction job candidate may be a job having a possibility of being an obstruction job. For example, an obstruction job candidate may also not be an obstruction job. The obstruction job extraction unit 16 may extract, as obstruction jobs, jobs that satisfy a certain condition among obstruction job candidates. The certain condition may be a condition for specifying obstruction jobs. The obstruction job output unit 17 outputs information regarding obstruction jobs.

The job record information storage unit 112 stores record information and so forth regarding executed jobs (hereafter referred to as "job record information"). The job record information is used for specifying obstruction job candidates or extracting obstruction jobs and so forth by the obstruction candidate specifying unit 15 and the obstruction job extraction unit 16.

Figure 6:
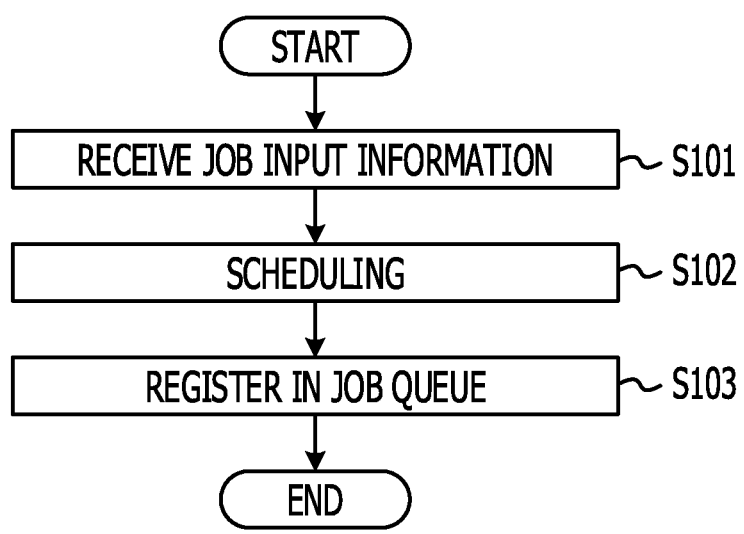
FIG. 6 depicts an exemplary processing of a job management device.

Hereafter, a processing procedure executed by the job management device 10 is described. FIG. 6 depicts an exemplary processing of a job management device. The job management device 10 depicted in FIG. 5 may execute the processing depicted in FIG. 6 when a job is input.

When job input information is input by a user in any of the user terminals 20, the user terminal 20 transmits the job input information to the job management device 10. In operation S101, the job receiving unit 11 receives the job input information. For example, the input of job input information by a user may correspond to a job input operation performed by a user. A job relating to job input information that has been input may be referred to as a "target job".

FIG. 7 depicts an exemplary job input information. In FIG. 7, the job input information includes items such as the job ID, the job name, the user name, the execution program name, the number of resources to be used, and the expected execution time.

The job ID may be identification information for each job. The job name may be a job identification name that the user is able to arbitrarily append to a job. The user name may be an identification name of the user who originally input the job. The execution program name may be an identification name of the program that causes a computation resource 30 to execute the target job. The number of resources to be used may be the number of computation resources 30 to be used in a parallel manner by the target job. The expected execution time may be a prediction value for the execution time of the target job.

The job name, the user name, the execution program name, the number of resources to be used, and the expected execution time are input by the user to a user terminal 20 when a job is input. For example, the expected execution time is designated based on the structure of the target job and the experience of the user and so forth. It is permissible for the job ID to not be included in the job input information received from the user terminal 20. For example, the job ID may be generated and appended to the job input information of the target job by the job receiving unit 11. The user name, for example, may be a value that is input when the user logs in.

The job receiving unit 11 adds a record corresponding to the target job, to the job record information storage unit 112, and from among the items included in the record (job record information), stores the values of items that become fixed when the job input information is received.

FIG. 8 depicts an exemplary job record information. In FIG. 8, the job record information includes items such as the job ID, the job name, the user name, the number of resources to be used, the input time, the resource utilization rate at job input-time, the start time, the end time, the execution time, the waiting time, a presence/absence of a backfilling application, and the longest available time during waiting.

The job ID, the job name, the user name, and the number of resources to be used may be the same as the items having the same names included in the job input information. The input time is the time at which the job is input, for example, the time at which the job input information is received. The resource utilization rate at job input-time may be the utilization rate of the computation resources 30 at the time at which the job input information is received. For example, in the case where there are 100 computation resources 30 in the computation center 1, and 60 of those are in use, the utilization rate of the computation resources 30 may be 60%.

The start time is the time at which the job is started. The end time is the time at which the job ends. The execution time is the time period from the job starting to the job ending, for example, the elapsed time from the start time of the job to the end time. The waiting time is the time from the job being input to the job starting, for example, the elapsed time from the input time to the start time. The waiting time is generated if, when a job is input, there are not enough computation resources 30 that are not being used (not in use) with regard to the number of resources to be used for the job. The presence/absence of the backfilling application indicates whether or not there is a record of backfilling having been applied to the job. The longest available time during waiting may be the longest time from among the times for which the state where computation resources 30 of a number equal to or greater than the number of resources to be used for a job are not being used has continued while the job has been waiting (during the waiting time).

When job input information is received, values that are the same as the job input information are stored as the job ID, the job name, the user name, and the number of resources to be used. The time at which the job input information is received is stored as the input time. The utilization rate of the computation resources 30 when the job input information is received is stored as the resource utilization rate at job input-time. The job management device 10 may ascertain the utilization rate of the computation resources 30 by a commonly known technology.

The start time and the execution time of the job are specified even if any one of the start time, the end time, and the execution time is not included in the job record information. Therefore, it is permissible for any one of the start time, the end time, and the execution time to not be included in the job record information. The input time and the waiting time for the job are specified even if any one of the input time, the start time, and the waiting time is not included in the job record information, and it is therefore permissible for any one of the input time, the start time, and the waiting time to not be included in the job record information.

The schedule unit 12 executes scheduling processing for target jobs, and decides the execution order of the target jobs (S102). The scheduling processing may be carried out by a commonly known job scheduler or the like. For example, the execution order of the target jobs may be decided by the FIFO system. If it is possible for backfilling to be applied to the target jobs, the execution order for the case where backfilling is applied may be given to the target jobs.

In the determination as to whether it is possible for backfilling to be applied, a commonly known scheduling method using backfilling may be used. For example, whether it is possible for backfilling to be applied may be determined based on the current usage situation of the computation resources 30, and the number of resources to be used and the expected execution time of the job input information stored in the job queue 111, or the number of resources to be used and the expected execution time and so forth of the job input information of the target jobs.

The schedule unit 12 stores the job input information of the target jobs in positions, in the job queue 111, corresponding to the execution order given to the target jobs by the scheduling processing (S103). For example, if backfilling is not applied to the target jobs, the job input information may be added to the end of the job queue 111. The schedule unit 12 stores "no" indicating that backfilling has not been applied, with respect to the presence/absence of the backfilling application of the job record information of the target jobs. If backfilling is applied to a target job, the job input information of the target job is added at a position, in the job queue 111, corresponding to the execution order in the case where backfilling is applied. The schedule unit 12 stores "yes" indicating that backfilling has been applied, with respect to the presence/absence of the backfilling application of the job record information of the target job.

For example, when computation resources 30 equivalent to the number of resources to be used of the job input information stored at the head of the job queue 111 become available, the dispatch unit 13 allocates the job relating to the job input information, to the computation resources 30 that are available (not being used). As a result, the job starts. At such time, from among the items included in the job record information (FIG. 8) of the target job, the dispatch unit 13 stores the values of items that become fixed when the job starts. For example, the current time is stored as the start time. The elapsed time from the input time to the start time is stored as the waiting time. The longest time from among the times for which the state where computation resources 30 of a number equal to or greater than the number of resources to be used for the target job are not being used has continued during the waiting time (from the input time to the start time) of the target job is stored as the longest available time during waiting.

The continuation time, during the waiting time of the target job, of the state where computation resources 30 of a number equal to or greater than the number of resources to be used for the target job are not being used may be specified based on information indicating the time-sequential transition of the number of computation resources 30 not being used during the waiting time of the target job. The information indicating the time-sequential transition of the number of computation resources 30 not being used during the waiting time of the target job may be derived based on the start times, the execution times, and the numbers of resources to be used of the job record information of jobs having start times that are earlier than the target job.

FIG. 9 depicts an exemplary processing of the job management device. In FIG. 9, for example, the processing executed by the job management device depicted in FIG. 5 when a job ends is depicted.

When a job (hereafter referred to as the "target job") executed using the computation resources 30 ends, the job ID of the job that has ended is notified from a computation resource 30 to the job management device 10. In operation S201, the end notification receiving unit 14 receives the job ID of the job that has ended, notified from the computation resource 30. From among the items included in the job record information (FIG. 8) of the target job, the end notification receiving unit 14 stores the values of the items that become fixed when the job ends (S202).

For example, the time at which the end notification is received is stored as the end time. The elapsed time from the start time to the end time is stored as the execution time.

The obstruction candidate specifying unit 15 determines whether or not the target job needs a waiting time (S203). For example, it is determined whether or not the value of the waiting time of the job record information of the target job is 0. If the waiting time is 0 ("no" in S203), the target job is excluded from obstruction job candidates. If the waiting time is not 0 ("yes" in S203), because there is a likelihood of the target job being an obstruction job, processing advances to operation S204.

Jobs that do not have a waiting time and are executed immediately after being input do not obstruct the opportunity to utilize backfilling, and therefore may be excluded from the obstruction job candidates. If a certain time is used by overheads and so forth from a job being input to the job starting, whether or not a waiting time is needed may be determined in accordance with whether or not the waiting time exceeds the certain time. For example, the waiting time may be the time used by overheads and so forth, or may be the continuation time of the state where the job does not start due to the use of the computation resources 30 for another job.

In operation S204, the obstruction candidate specifying unit 15 determines whether or not backfilling has not been applied to the target job. If backfilling has been applied to the target job ("no" in S204), the target job is excluded from the obstruction job candidates. If backfilling has not been applied to the target job ("yes" in S204), because there is a likelihood of the target job being an obstruction job, processing advances to operation S205. In this case, the target job may be specified as an obstruction job candidate. Whether or not backfilling has been applied to the target job may be determined by referring to the presence/absence of the backfilling application of the job record information (FIG. 8) of the target job. If the start time of the target job is later than the start times of all of the jobs having input times that are earlier than the target job, it may be determined that backfilling has not been applied to the target job. For example, if the start time of the target job is earlier than the start times of any of the jobs having input times that are earlier than the target job, it may be determined that backfilling has been applied to the target job.

In operation S205, the obstruction job extraction unit 16 compares the longest available time during waiting of the job record information of the target job, and the execution time of the job record information. If the longest available time during waiting is less than the execution time ("no" in S205), the obstruction job extraction unit 16 determines that the target job is not an obstruction job.

If the longest available time during waiting is equal to or greater than the execution time ("yes" in S205), the obstruction job extraction unit 16 determines that the target job is an obstruction job. For example, even though a state where computation resources 30 of a number equal to or greater than the actual number to be used are not used by the target job has continued during the waiting time of the target job, because backfilling has not been applied to the target job, it may be determined that the target job is an obstruction job.

If it is determined that the target job is an obstruction job ("yes" in S205), the obstruction job output unit 17, for example, outputs the job record information of the target job (S206). For example, from among the items included in the job record information, it is permissible for only the user name to be output, and it is permissible for the user name and the job name to be output. The output may be carried out by notification to the user terminal 20 of the user relating to the user name, or by notification to the user terminal 20 of an administrator of the computation center 1. If a notification is carried out to the user, the user may become aware that the opportunity for backfilling to be utilized has been obstructed by a job of the user. Therefore, the awareness of the user in relation to increasing the accuracy of the expected execution times of jobs may increase thereafter. If a notification is carried out to the administrator, the administrator may direct the user who input the job (the person who input the job) that obstructed the opportunity for backfilling to be utilized, to increase the accuracy of the expected execution times. As a result, the possibility of obstruction jobs being generated may decrease, and the usage efficiency of the computation resources 30 may improve.

An obstruction job that has obstructed the opportunity for backfilling to be utilized may be extracted, and information regarding the obstruction job may be notified to the user or the administrator. Therefore, the awareness of the user in relation to improving the accuracy of expected execution times on which the effectiveness of backfilling depends may be improved. As a result, the opportunity for backfilling to be utilized may increase, and the usage efficiency of the computation resources 30 may improve.

When a job ends, whether or not a job is an obstruction job may be determined. Operation S203 and operations thereafter depicted in FIG. 9 may be executed in batches with respect to the job record information stored in the job record information storage unit 112.

The job record information storage unit 112 may be an exemplary storage unit. The obstruction candidate specifying unit 15 may be an exemplary specifying unit. The obstruction job extraction unit 16 may be an exemplary extraction unit. The obstruction job output unit 17 may be an exemplary output unit. The job management device 10 may be an exemplary job extraction device. The user name may be an exemplary identification information of a person who has input a job.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A job extraction method, comprising:
referring, by a computer, to a storage unit that stores first information indicating an input time, a start time, an execution time, and a number of computation resources to be used, for each of a plurality of jobs that are to be executed using one of a plurality of computation resources;
specifying, from among the plurality of jobs, a plurality of first jobs having a first waiting time from a first input time to a first start time which is later than a second start time of a second job having a second input time which is earlier than the first input time; and
extracting, based on second information indicating a time-sequential transition of a number of computation resources that are not being used derived based on the input time, the start time, the execution time, and the number of computation resources to be used, from among the plurality of first jobs, a third job for which a state where computation resources of a number equal to or greater than the number of computation resources to be used for one of the plurality of first jobs are not being used has continued for a first execution time of the first job or longer during the first waiting time of the one of the plurality of first jobs.

2. The job extraction method according to claim 1, further comprising:
outputting identification information of a person who inputs the plurality of jobs which is stored in the storage unit.

3. A job extraction device comprising:
a storage configured to store first information indicating an input time, a start time, an execution time, and a number of computation resources to be used, for each of a plurality of jobs that are to be executed using one of a plurality of computation resources; and
a circuitry configured to perform operations to:
specify, from among the plurality of jobs, a plurality of first jobs having a first waiting time from a first input time to a first start time which is later than a second start time of a second job having a second input time which is earlier than the first input time; and
extract, based on second information indicating a time-sequential transition of a number of computation resources that are not being used derived based on the input time, the start time, the execution time, and the number of computation resources to be used, from among the plurality of first jobs, a third job for which a state where computation resources of a number equal to or greater than the number of computation resources to be used for one of the plurality of first jobs are not being used has continued for the execution time of the first job or longer during the first waiting time of the one of the plurality of first jobs.

4. The job extraction device according to claim 3,
wherein the storage stores identification information of a person who inputs the plurality of jobs, and
the circuitry outputs the identification information.

5. A job extraction system that includes:
a CPU, coupled to a plurality of computation resources, configured to execute a job extraction program; and
a storage device configured to store the job extraction program,
wherein the job extraction program causes the CPU to:
refer to a storage unit that stores a first information indicating a input time, a start time, a execution time, and a number of computation resources to be used, for each of the plurality of jobs that are to be executed using one of the plurality of computation resources,
specify, from among the plurality of jobs, a plurality of first jobs having a first waiting time from a first input time to a first start time which is later than a second start time of a second job having a second input time which is earlier than the first input time, and
extract, based on second information indicating a time-sequential transition of a number of computation resources that are not being used derived based on the input time, the start time, the execution time, and the number of computation resources to be used, from among the plurality of first jobs, a third job for which a state where computation resources of a number equal to or greater than the number of computation resources to be used for one of the plurality of first jobs are not being used has continued for the execution time of the first job or longer during the first waiting time of the one of the plurality of first jobs.

6. The job extraction system according to claim 5,
wherein the job extraction program causes the CPU to output identification information of a person who inputs the third job which is stored in the storage unit.

7. The job extraction system according to claim 5,
wherein the plurality of computation resources are coupled to the job extraction system via a network.

8. The job extraction system according to claim 5,
wherein the storage device includes the storage unit.

* * * * *